(No Model.) 4 Sheets—Sheet 1.

H. SCHULZE-BERGE.
GEARING DEVICE.

No. 305,714. Patented Sept. 23, 1884.

Witnesses:
W. Bakewell
W. B. Corwin

Inventor:
Hermann Schulze-Berge

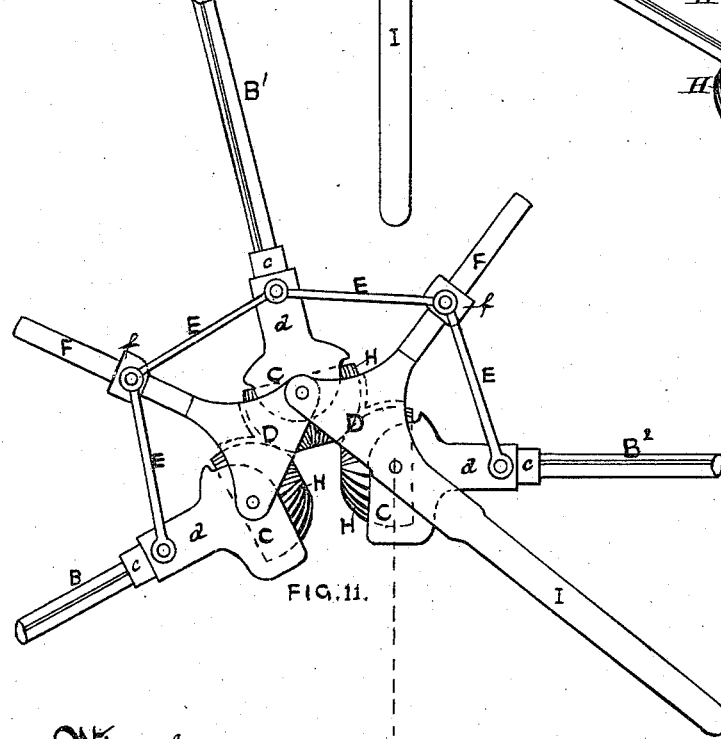

(No Model.) 4 Sheets—Sheet 3.
H. SCHULZE-BERGE.
GEARING DEVICE.
No. 305,714. Patented Sept. 23, 1884.
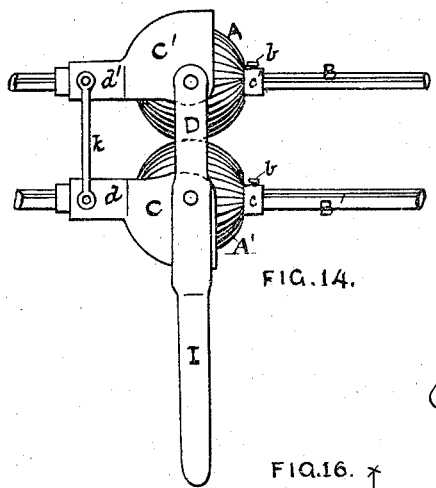
FIG. 14.
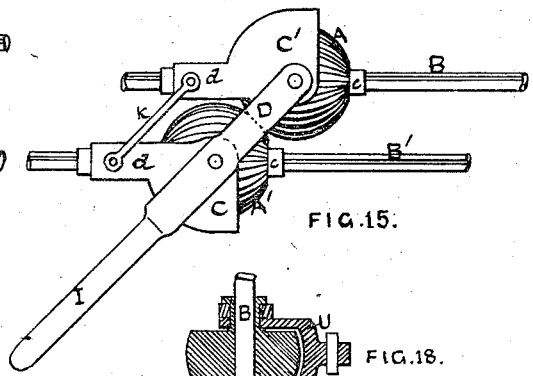
FIG. 15.
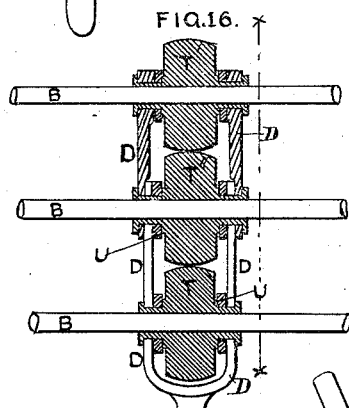
FIG. 16.
FIG. 20.
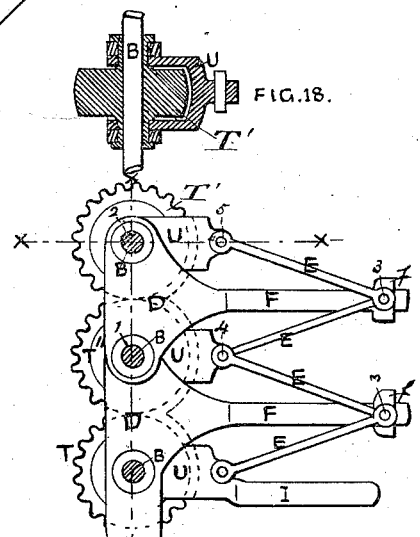
FIG. 18.
FIG. 17.
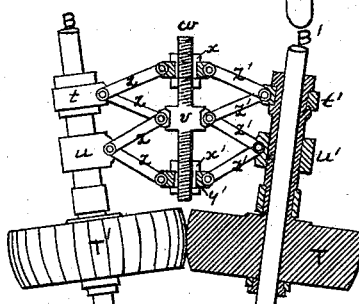
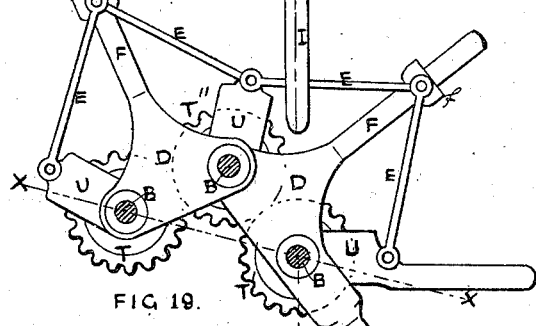
FIG. 19.
Witnesses:
W. F. Bakewell
N. B. Corwin
Inventor
Hermann Schulze-Berge (No Model.) 4 Sheets—Sheet 4.
H. SCHULZE-BERGE.
GEARING DEVICE.
No. 305,714. Patented Sept. 23, 1884.
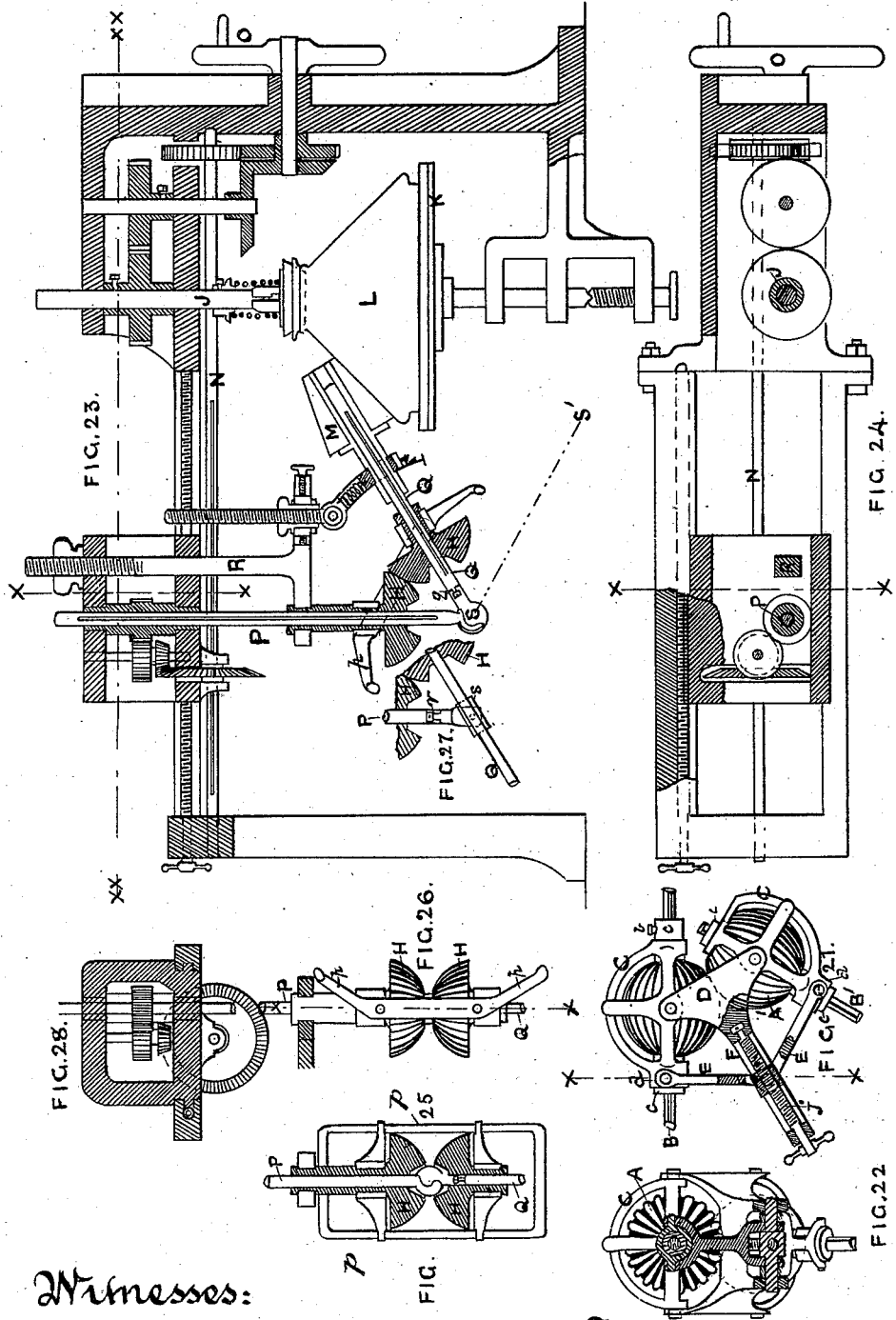
Witnesses:
W. Bakewell
W. B. Corwin
Inventor:
Hermann Schulze-Berge

UNITED STATES PATENT OFFICE.

HERMANN SCHULZE-BERGE, OF ROCHESTER, PENNSYLVANIA.

GEARING DEVICE.

SPECIFICATION forming part of Letters Patent No. 305,714, dated September 23, 1884.

Application filed January 11, 1884. (No model.)

*To all whom it may concern:*

Be it known that I, HERMANN SCHULZE-BERGE, of Rochester, in the county of Beaver and State of Pennsylvania, have invented a new and useful Improvement in Gearing Devices; and I do hereby declare the following to be a full, clear, and exact description thereof, reference being had to the accompanying drawings, in which—

Figure 1 is a section through their axes of a pair of spherical gear-wheels with shafts and cages. Fig. 2 is a horizontal section through dotted lines $x\,x$ of Fig. 1. Fig. 3 is a side view of a pair of spherical gear-wheels with connecting devices. Fig. 4 shows a modified form of connecting devices. Fig. 5 shows a pair of hemispherical wheels and connecting devices. Figs. 7 and 8 represent the connection of cages with hemispherical gear-wheels. Fig. 9 shows the devices for connecting spherical gear-wheels when more than two wheels are to be used. Fig. 10 is a cross-section of the connecting links and arm through the dotted line $x\,x$, Fig. 9. Fig. 11 shows the position of the devices of Fig. 9 when the shafts are moved out of parallelism. Fig. 12 shows a modified form of connection of the devices shown in Fig. 9. Fig. 13 is a cross-section through the dotted lines $x\,x$, Fig. 12. Figs. 14 and 15 illustrate the connection of a pair of spherical gear-wheels permitting of a relative longitudinal motion. Fig. 16 is a cross-section, and Fig. 17 a side view, of three spherical wheels connected by their polar axes. Fig. 18 is a cross-section through the dotted line $x\,x$ of Fig. 17. Fig. 19 is a representation of the devices shown in Figs. 16 and 17 when the axes of the wheels are moved out of a right line. Fig. 20 illustrates a mode of connecting spherical gear-wheels by their polar axes, admitting of adjustment of their axes out of parallelism with each other. Fig. 21 shows a modified device for connecting two spherical gear-wheels. Fig. 22 is a cross-section through the dotted line $x\,x$ of Fig. 21. Fig. 23 is an illustration of the practical application of hemispherical gear-wheels. Fig. 24 is a longitudinal section through the dotted line $x\,x\,x\,x$, Fig. 23. Fig. 25 is a section through the dotted line $x\,x$ of Fig. 26. Fig. 26 is a side view of the hemispherical gear-wheels in Fig. 23 when turned pole to pole. Fig. 27 shows a modified arrangement of the shafts of the spherical gear-wheels in Fig. 28. Fig. 28 is a cross-section through the dotted line $x\,x$ of Fig. 23.

In various kinds of machinery it is desirable to be able to change the relative angle of two or more shafts which communicate rotary motion one to another, their motion being derived from a common source or prime motor. In order to do this, either while the machinery is in operation or before it is set in motion, it is usual to employ devices known as "universal joints." Such devices, however, permit of a comparatively limited change of angle, and can only be applied at opposite extremities of the connected shafts.

The object of my invention is to provide a gearing device by which shafts may be geared together at the same or at opposite ends, and which will permit of a much larger range of angle of inclination than can be attained by means of a universal joint.

In order to illustrate the practical application of my improved gearing device to an organized machine, I have shown in Fig. 23 of the drawings a machine for printing on glassware, in which the shafts of the printing-roller and of the lathe which holds the glass article are geared together with my spherical gear-wheels, whereby a perfect synchronism of rotary motion is preserved, while the printing-roller shaft is capable of motion toward or from the shaft of the lathe while they are both in operation; and whereby, also, these shafts may be set at almost any desired relative angle, so as to accommodate the machine to the printing on articles of various shapes and sizes. This illustration serves to show the capabilities of my improvement, which may also be applied to machinery of all kinds, either large or small, in which it is desirable that the relative position of geared shafting should be susceptible of variation.

In order, therefore, that others may be able to use my improvement, I will proceed to describe its construction and operation.

My invention relates to a new description of gear-wheels having substantially a spherical shape, or that of a section of a sphere.

My improved gear-wheel in its perfect, as distinguished from its truncated, form consists of a globe having cogs or teeth extending from one pole of the globe to the other; the cogs or teeth therefore gradually widening from the poles toward the middle or equatorial circumference of the globe. I use the term "globe" in this connection because the surface of the gear-wheel at the external surface of the teeth is a slightly oblate spheroid, while its surface at the base of the teeth is a slightly prolate spheroid, while the pitch-line of the teeth is always in the true spherical surface which would be described by the rotation of the axis of a circle the diameter of which is equal to a line drawn from the pitch-line of one tooth through the center of the globe to the pitch-line of the tooth diametrically opposite to it. With this explanation I shall hereafter use the terms "spherical" and "hemispherical" as applied to my gear-wheels, notwithstanding that it is not mathematically correct. It is obvious that when two such spherical toothed gear-wheels are brought into gearing contact with their equatorial diameters in the same plane they may be rotated freely, just as ordinary cog-wheels, provided, of course, that the teeth are of the same width, pitch, and distance apart, and, further, that if their axes are inclined to each other they will still remain in gear and may be so rotated; and, further, that this inclination of their axes may be continued with the same result until or nearly until their polar axes are brought into the same right line, when the cogs vanish and the gearing-connection would cease. Hence there is this limit only to the degree of inclination of the axes of a pair of these gear-wheels, which may be made without throwing the wheels out of gear, that if the inclination from a right line be so slight that the cog-teeth will not practically remain in gear the mutual action will cease. Hence, in practice, these spherical gear-wheels may be slightly truncated at both poles in a plane parallel to that of the equatorial diameter of the sphere. In practice the shafts of these gear-wheels will pass through or be in the line of the polar axis of the sphere, and in that position, for the reason just stated, they interfere less with the scope of action of these wheels than if they could occupy any other position.

In Fig. 1, Sheet 1, A A' represent a pair of spherical cog-wheels by a section in line of their polar axes. The dotted line on either side of each wheel is the pitch-line of the teeth, being arcs of a true circle, and $a$ representing the cog-teeth of the wheels. Each of these spherical wheels has a central bore in its polar axial line through which the shaft B of each wheel passes. These wheels may be keyed to their shafts; but frequently they will be arranged so as to slide on the shaft and fastened in place by a set-screw, $b$, (shown in Fig. 6,) the wheel being prevented from rotation on its shaft by a feather. The spherical wheels have at one end (by which I mean in this specification one of the poles of the sphere) a collar, $c$, extending beyond the circumference of the wheel. Usually there is such a collar, $c'$, also at the other end of the wheel. To these collars $c\ c'$ is attached a frame or cage, C, which is a hemisphere forming a cap or cover to one-half of each wheel, each cage C having a sleeve, $d$, at each end, which encircles the collar $c$ of the wheels, as shown in Figs. 1 and 3. These cages C and C' are connected by two links, D, one on each side of a pair of wheels, A A', and which are pivoted to the cages at the points 1 and 2, Figs. 2 and 3. These two links D D hold the cages in place and prevent their changing their position when the wheels revolve. The pivotal points 1 and 2 of the cages are on diametrically-opposite points of the spherical wheels and in the plane of their equatorial diameters, or in the arrangement shown in Figs. 17 and 19, and of their poles, so that the distance between the pivotal points 1 and 2 of the links is exactly that of the diameter of the spherical wheels measured from the pitch-lines of the teeth. These links, therefore, do not interfere with the free rotation of the wheels when in gear, but serve to hold them together in gear with each other. They would not, however, prevent the wheels from sliding on each other in the direction of their polar axes, and if permitted to do so, unless their axes remained parallel, as in Fig. 15, Sheet 3, the wheels would become clogged, because the teeth diminish in width as they approach the ends or polar axes of the wheels. It is necessary, therefore, to provide means for preventing such sliding action, which I effect by means of the rods E E', which are of equal length, and are pivoted at one extremity to the collars $d\ d'$ of the cages C C', and at the other end either to each other, or, which is the same thing in effect, to a sleeve, $f$, on an arm, F, which arm is rigidly attached to or forms a rectangular extension from the center of the links D, (being bifurcated, so as to connect with the link on each side of the cages,) as seen in Figs. 3 and 10.

The pivotal points of the rods E E' on the collars $d$ are marked 4 and 5, and the pivotal point or points on the collar $f$ are marked 3, the several pivotal points forming the angles of a pentagon, 1, 2, 5, 3, and 4. Now, it is evident that if the shafts B B', Fig. 3, be drawn asunder, so as to be out of parallelism with each other, as shown in Fig. 6, the wheels A A' will turn on each other without necessarily rotating on their axes, and that the point of gearing contact on both wheels will be in the same hemisphere and equally distant from the poles of the two wheels. By such motion of the shafts B B' the points 1 and 2 will remain at the same distance apart, those points being fixed by the link D, while the points 4 and 5 will be farther separated, and the point 3 will approach nearer to the link D and to the points 1 and 2. Thus the spheres A A' will always preserve the same relative position of latitude, no matter what may be the inclination of their axes to each other. A spiral spring, $g$, may be placed on the arm F, bearing against the sliding collar $f$, so as to push it outward, and thus give the shafts B B' a tendency to return to their normal condition of mutual parallelism. Where this is not desired, the spring $g$ will be dispensed with.

In place of the spring $g$, and as an equivalent device performing the same function with the added one of adjustability of pressure, a lever, $h$, with a movable weight, W, may be used, as shown in Fig. 5, where the lever $h$ is shown pivoted to the link D at one end, and a sleeve, $i$, which may be set at any point on the lever $h$, presses against a projection on the sleeve $f$, tending to push it outward and draw the shafts back to a parallel position.

When it is desired that the angle of inclination of the shafts B B' of the spherical gear-wheels A A' shall be fixed and yet adjustable, the device shown in Fig. 21, Sheet 4, may be employed. This differs from that shown in Fig. 3 in substituting for the spiral spring $g$ a screw, $j$, which is attached to the link D by a swivel, and instead of the sliding collar $f$ is a nut, $f'$, which engages the screw $j$, so that by turning the screw $j$ the angle of the shafts B B' may be varied at pleasure.

In Figs. 14 and 15 is shown a mode of connecting the gear-wheels, which may be useful in some cases, as it preserves the parallelism of the shafts B B' of the gear-wheels, but allows them to move longitudinally in relation to each other. In this case the links D are used to connect the cages C C' of the wheels A A'; but the sleeves $d\ d$ of the cages are connected by a rod, $k$, which is parallel to the link and of equal length between its pivotal points, so that the four pivots are in the four angles of a parallelogram, permitting of the parallel motion of the shafts B B', as shown in Fig. 15, while the wheels remain in gear.

Another connection of the spherical wheels is shown in Fig. 4, Sheet 1, in which the link D is employed to connect the cages, and a rod, $l$, sliding in a socket, $m$, placed parallel to link D, is used. In this case, as before, the distance between the pivotal points 1 and 2 on the link is constant; but the distance between the pivotal points 3 and 4 on the collars of the cages C C' may be increased, as the shafts B B' are set at a greater inclination to each other. By this arrangement the wheels are prevented from sliding lengthwise on each other, excepting when the length of the rod and socket $l$ and $m$ becomes equal to that of the link D between their respective pivotal points.

For many purposes hemispherical wheels will answer fully as well as spheres; but they should in practice be rather more than hemispheres, so as to afford a good gearing-connection when their shafts B B' are parallel.

Figs. 5, 6, 7, and 8 of Sheet 1 and Figs. 9, 11, and 12 of Sheet 2 illustrate the use of hemispherical gear-wheels. In the use of this form of wheel the cages should be situate below the wheel, as in Fig. 6, and not on the side, as in Fig. 3, as this construction permits three or more wheels to be geared together.

Fig. 9 shows how the sleeves $d$ of the cages C are attached to the collars $c'$, which extend from the lower or flat side of the hemispherical wheel. In other respects the mode of connection by means of the pentagonal arrangement of the pivotal points and the use of the link D, rods E E, and arm F may be the same.

Fig. 12, Sheet 2, shows a modified form of connection in which the link D is used; but the arm F is dispensed with, and in place of it the rods E cross each other, and are connected at one end to the cage of one wheel and at the other end to a slide, $n'$, which slides in an extension of the collar $d$ on the shaft of the other wheel.

Figs. 9 to 11 illustrate the connection of three hemispherical gear-wheels, H H H, the links D, with their arms F and sliding collar, and the rods E E, connecting the collar on the cage of each pair of shafts B' B² with the sliding collar on the arm F placed between them. When the lower arm attached to one of the links D is moved to the position shown in Fig. 11, the shafts B B' B² radiate from a common center, like the spokes of a wheel, the contained angle between the adjoining shafts being the same, and being changed exactly to the same degree by every movement of the lever I.

Fig. 9 shows the same set of shafts B B' B² placed parallel to each other.

Fig. 10, which is a cross-section on the line $x\ x$ of Fig. 9, shows how the two links D D on opposite sides of each adjacent pair of wheels are connected together by the bifurcation of the arm F.

Figs. 23 to 28 on Sheet 4 illustrate the application of my hemispherical gear-wheels to the driving of machinery. The machine represented is for printing on glassware. J is the spindle of a lathe carrying a chuck, K, in which the lamp-shade L is placed. M is the printing-roller, which is designed to be revolved at the same speed as the chuck K of the lathe. The horizontal shaft N, driven by gearing from the hand-wheel O, causes the revolution of the vertical shaft P, to which the printing-roller shaft Q is attached by a knuckle-joint at S. The angle of inclination of the shaft Q, which carries the printing-roller M, fastened to the vertical shaft P, which drives the shaft Q, is about sixty degrees. The two hemispherical gear-wheels H H' have their bearings pivoted in a quadrilateral frame, $p$, at the points 6, 7, 8, and 9. (See Fig. 25.) The shafts P and Q pass through the sliding bearings of the wheels H H', as shown in Fig. 23, and the bearing of one of the wheels, H', extends up the shaft P as a sleeve, and is supported by a hanging bracket, R. The shaft Q of the printing-roller M has a swivel on it at $q$, so as to permit it to turn in a different direction from the shaft P. It is evident that, notwithstanding the angle of inclination between the shafts P and Q is so small, the hemispherical gear-wheel H', being rotated by the shaft P, will cause the hemispherical gear-wheel H, and with it the printing-roller shaft Q, also to rotate, thus performing the function of a universal joint. Now, if it should be desired to increase the angle of inclination of the shaft Q with the shaft P to one hundred and twenty degrees, (as indicated by the dotted lines S S', Fig. 23,) the hanging bracket R being lowered and the free end of the frame $p$ also lowered, the wheels H H' will turn in their bearings and approach the angle of the shafts P and Q, still, however, remaining in gear and rotating the shaft Q in any position in which it may be placed between that shown in Fig. 23 and the line S S'.

Fig. 27 shows the arrangement of the driving-shaft P and the working-shaft Q, by which the shaft Q may be extended beyond the point of connection of the two shafts by means of a swivel, $r$, on the shaft P, and a sleeve, $s$, on the shaft Q, to which the driving-shaft P is pivoted.

Fig. 26 shows the position of the gear-wheels H H' when the shafts P Q are extended in a right line, and consequently the gear-wheels H H' standing pole to pole are out of gear.

Figure 1:
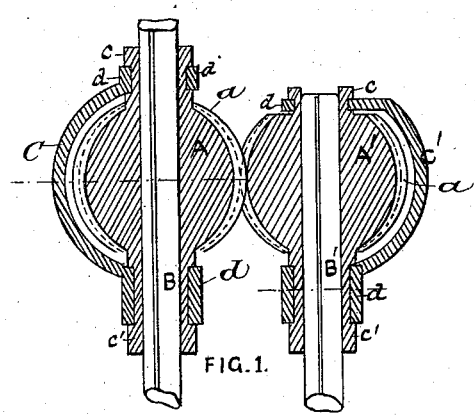
Figure 3:
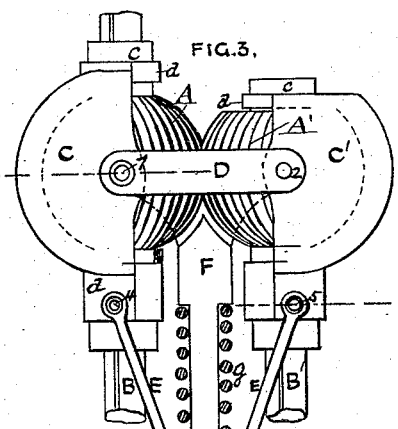
Figure 2:
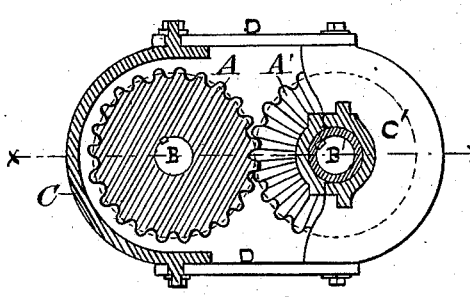
Figure 4:
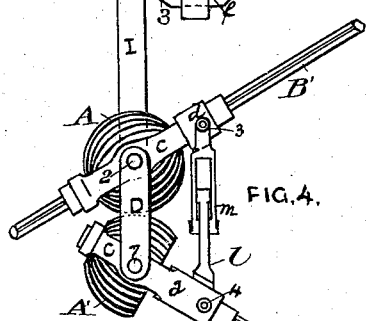
Figure 5:
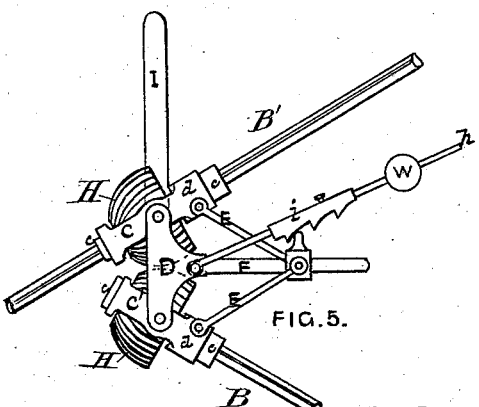
Figure 6:
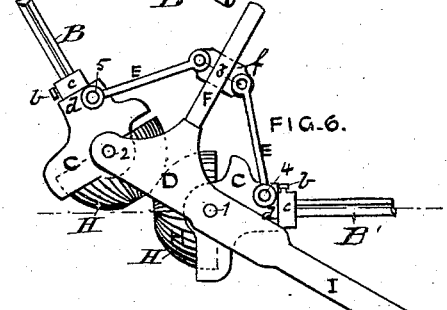
Figure 7:
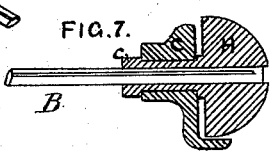
Figure 8:
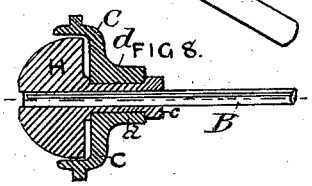

Spherical cog-wheels truncated at both sides of the equatorial diameter may be used for various purposes. In Figs. 16 to 19, Sheet 3, such wheels T T are shown. In this case the shafts are kept in a parallel position to each other, while they are susceptible of change of position on a horizontal direction. In this case the T-shaped link and arm D F and rods E E are used to connect the shafts of the wheels, but the cages C are dispensed with, and in place of the cages a bifurcated strap, U, serves to connect the rods E E with the sleeve $f$ on the rods F at one end, and with the shafts of the wheels, as shown in Fig. 18. This arrangement may be used when the two outside wheels, T and T', are working-shafts, or one a working-shaft and the other a driving-shaft having bearings which can slide toward each other in a right line. (Represented by the dotted line $xx$ in Fig. 19.) In this case the wheel T'' is an idler. Now, by moving the lever I the axes of the wheels T and T' may be moved toward each other until the peripheries of these wheels nearly touch, as in Fig. 19, or may be separated on the line $x$ $x$ until the axes of the wheels T T' T'' are in a right line, as in Fig. 17.

In Fig. 20 is shown an arrangement by which with the use of a pair of truncated spherical wheels, T T', their axes may be more or less inclined to each other without disturbing the gear of the wheels. This is effected by means of a stationary collar, $t t'$, on each of the shafts B B', within which the axles revolve, and a sliding collar or sleeve, $u u'$, on each shaft between the collar $t$ or $t'$ and the wheel T or T'. Between the shafts B B', and parallel to them when they are parallel to each other, is a screw, $w$, on which is a flange, $v$, and two screw-nuts, $x x'$, work on the screw $w$—one above and the other below the flange $v$. Around each of the nuts $x x$ is a ring, $y y'$, within which the nuts turn freely on the screw $w$. A link, $z$, pivoted to the collar $t$, is pivoted at its other end to the ring $y$ on the upper nut, $x$, and a similar link, $z$, also pivoted to the collar $t$, is pivoted at its other end to the flange $v$ on the screw $w$. Another link, $z$, is pivoted at one end to the flange $v$ and at the other end to the sleeve $u$, and a fourth link, $z$, is pivoted at one end to the sleeve $u$ and to the ring $y$ on the lower nut, $x'$. A similar arrangement of links $z$ connects the collars $t t'$ and the sleeve $u$ and $u'$ on the shafts B and B', respectively, with the flange $v$ and the rings $y y'$ on the nuts $x x'$ of the screw $w$. Now, by adjusting the nuts so that the upper nut, $x$, shall be screwed down toward the flange $v$, and the lower nut, $x'$, screwed down so as to be farther away from the flange $v$, the shafts B and B' may be made to assume an inclined position relatively to each other, as shown in Fig. 20.

I do not herein claim the mechanism for printing on glassware, herein described and illustrated, for the reason that the same forms the subject-matter of two other pending applications—viz., Serial Nos. 117,133 and 117,134, filed January 11, 1884.

What I claim as my invention is—

1. Globular gear-wheels having cog-teeth extending from one pole to the other, the pitch-line of the teeth of which is in the surface of a sphere of the diameter of the polar axis of the globe, in combination with a shaft extending through or in line of its polar axis, 2. The combination of two or more spherical cog-wheels, or sections thereof, and their shafts, a cage or frame to each wheel, connected but not revolving therewith, a pair of links pivotally connected with each pair of cages, each pair of links having an arm extending at right angles therefrom, and rods pivotally connected with said cages and with a sleeve on said arm, substantially as and for the purpose described.

3. A pair of spherical cog-wheels, or sections thereof, and their shafts, with devices, substantially such as hereinbefore described, pivotally connected at five points, two of which pivotal points are in the line either of the polar or of the equatorial axes of said wheels, a third point equidistant from and at right angles to an imaginary line connecting the first and second points, and the third and fourth pivotal points situate between the said imaginary line and the third point and equidistant from the first and second points and also from the third point, substantially as described.

4. The combination of two or more spherical cog-wheels, or sections thereof, and their shafts, with the cages $c c'$, bifurcated arm F, links D D', sleeve $f$, rods E E, and weighted lever $h$, for connecting two adjoining wheels, substantially as and for the purpose set forth.

5. Two or more spherical cog-wheels, in combination with a pair of links, D, connecting the polar axis of two adjoining wheels, and an arm, F, rigidly connected with each pair of links, and having a sleeve, $f$, the bifurcated straps U and rods E, each of said rods being pivoted at one end to a sleeve, $j$, and at the other to one of the straps U, substantially as described.

6. The combination of two or more spherical cog-wheels, or sections thereof, each having a shaft or axle, with a cage, $c\ c'$, to each wheel, and a pair of links, D D, connecting the cages of each pair of wheels on the line of the equatorial diameter thereof, substantially as described.

7. The combination of a pair of spherical cog-wheels, each having a shaft, B, with cages C, links D, and connecting-rod K, constructed and arranged as described with reference to Fig. 14.

8. The combination of two or more spherical cog-wheels, or sections thereof, each having a shaft or axle, a pair of links, D, connected by arm F, screw-nut $k$ on said arm, and rods E E, connecting each pair of cages with the sleeve, and screw $j$ on the arm F, and engaging said nut, substantially as described with reference to Fig. 21.

9. The combination of devices consisting of a pair of spherical cog-wheels, or sections thereof, each having a shaft, with the rings $v\ v'$, sliding collars $u\ u'$, and links $t\ t'$, constructed and arranged substantially as described with reference to Fig. 20.

10. A device for changing the inclination between two revolving axles while preserving their gearing-connection, consisting of the combination, with a pair of axles having spherical gear-wheels, of a pair of cages, each forming a bearing for one of such gear-wheels, a pair of links pivoted to the cages on lines corresponding with the equatorial axes of the spheroidal wheels, and a pair of rods of equal length pivoted together at one end, and one pivoted to one cage and the other pivoted to the other cage at points equidistant from the pivotal points of the links on each cage, substantially as and for the purposes described.

11. A device for changing the degree of inclination between two revoluble axles while preserving their gearing-connection, consisting of the combination, with a pair of axles having spheroidal gear-wheels, of a pair of cages, each forming a bearing for one of said gear-wheels, a pair of links pivoted to the cages on lines corresponding with the equatorial axes of the spheroidal gear-wheels, an arm rigidly attached to the links and extending at right angles thereto, a sleeve on said arm, and a pair of rods of equal length, both pivoted to the sleeve, and one pivoted to one cage and the other to the other cage at points equidistant from the equatorial axes of their gear-wheels, substantially as and for the purposes described.

In testimony whereof I have hereunto set my hand this 15th day of December, A. D. 1883.

HERMANN SCHULZE-BERGE.

Witnesses:
    W. BAKEWELL,
    W. B. CORWIN.